US008235292B2

(12) United States Patent
Talboys

(10) Patent No.: US 8,235,292 B2
(45) Date of Patent: Aug. 7, 2012

(54) SYSTEM AND METHOD FOR VERIFYING THE CONNECTION STATUS OF COUPLABLE ELEMENTS

(75) Inventor: Thomas Talboys, Bloomfield Hills, MI (US)

(73) Assignee: TMW Enterprises, Inc., Troy, MI (US)

( * ) Notice: Subject to any disclaimer, the term of this patent is extended or adjusted under 35 U.S.C. 154(b) by 182 days.

(21) Appl. No.: 12/686,120

(22) Filed: Jan. 12, 2010

(65) Prior Publication Data

US 2011/0168778 A1    Jul. 14, 2011

(51) Int. Cl.
 *G06K 7/10* (2006.01)
(52) U.S. Cl. ..................... 235/462.1; 235/375
(58) Field of Classification Search ............ 235/462.01, 235/375, 462.09, 462.1, 462.12
See application file for complete search history.

(56) References Cited

U.S. PATENT DOCUMENTS

| | | |
|---|---|---|
| 4,902,244 A | 2/1990 | Endo et al. |
| 5,203,718 A | 4/1993 | Chishima |
| 5,588,873 A | 12/1996 | Hamai et al. |
| 5,821,510 A | 10/1998 | Cohen et al. |
| 6,450,538 B2 | 9/2002 | Errard |
| 2003/0201319 A1 | 10/2003 | Patel et al. |

FOREIGN PATENT DOCUMENTS

| | | |
|---|---|---|
| EP | 0287913 A2 | 10/1988 |
| JP | 08-166765 A | 6/1996 |
| JP | 2008538423 A | 10/2008 |

*Primary Examiner* — Daniel St. Cyr
(74) *Attorney, Agent, or Firm* — Gifford, Krass, Sprinkle, Anderson & Citkowski, P.C.

(57) ABSTRACT

A system for verifying the connection status of couplable elements employs a code member having a pattern defining a machine-readable optical code disposed thereupon. The code member is physically divided into a number of separate segments each having a portion of the pattern defined thereupon. These segments are affixed to a series of couplable elements so that when those elements are appropriately coupled together, the code segments will be in an aligned relationship so as to form a particular optically readable pattern of data indicative of proper coupling of the elements. Further disclosed are methods employing the system.

17 Claims, 2 Drawing Sheets

SYSTEM AND METHOD FOR VERIFYING THE CONNECTION STATUS OF COUPLABLE ELEMENTS

FIELD OF THE INVENTION

This invention relates generally to inspection and verification systems. More specifically, the invention relates to an optical system which utilizes bar code scanning technology to verify the connection status of couplable elements.

BACKGROUND OF THE INVENTION

In many instances it is important to verify and make of record the fact that couplable elements such as electrical connectors, medical device components, mechanical elements, and the like are properly connected. This need is particularly important with regard to safety equipment such as airbag deployment controls, life support equipment, alarm systems, and the like. Toward that end the prior art has implemented a number of solutions based upon electrical, electromechanical, and optical systems for inspecting and verifying the status of such couplable elements.

Bar code technology is widely used for optically encoding data in a machine-readable form. In a bar code system, a pattern of indicia having differing degrees of reflectivity for a scanning wavelength of light is disposed so as to form a pattern which encodes data. In some instances, the pattern is comprised of a plurality of alternating light-reflecting and light-absorbing bars, which have given a generic name to this technology. Such stripe-based systems are now referred to as one-dimensional or 1D bar code systems. In other instances, more complex patterns of indicia are utilized, and while they are generically referred to as bar codes, they do not have defined bars, but rather comprise a more complex matrix. Such bar codes are referred to as matrix codes, two-dimensional codes, or 2D codes. In further instances, bar code patterns may comprise a plurality of differently colored indicia, or indicia having preselected degrees of reflectivity (gray scale). In the context of this disclosure, as well as in the relevant art, all of such codes are referred to as "bar codes".

Since bar code technology allows for the rapid, noncontact scanning of machine-readable data, the prior art has made attempts to utilize such technology for the purpose of verifying the status of electrical connector elements; however, prior art approaches have encountered a number of limitations. U.S. Pat. Nos. 4,902,244 and 5,558,873 both show an electrical connector system which utilizes a bar code reader to verify coupling of the connectors. In the disclosed systems of these two patents, one member of the electrical connector, typically the male member, has a body of light-absorbing material, typically black paint, disposed thereupon. A second member of the connector pair, typically the female member, includes a number of slits formed therethrough. When the connector is assembled, the light-absorbing material formed on the first connector member shows through the opening slits in the second member. In this manner, the two members cooperate to form a bar code which can be read by an optical scanner. The system of the '244 and '873 patents is limited in its use and applicability since neither of the coupling elements displays any machine-readable code prior to being connected together; the code pattern is only formed after connection. As will be explained in detail hereinbelow, this limitation prevents any optical data collection prior to coupling of the elements. Furthermore, this approach requires a very specific configuration of connectors insofar as the elements thereof must be configured to allow for the formation of the through slits and the disposition of the body of light-absorbing paint. Furthermore, the fact that this approach requires the forming of a plurality of precision openings in one of the connector elements complicates the manufacturing process and precludes changing the bar coded data without making significant changes in tooling and processing.

As will be explained in detail hereinbelow, the present invention provides a bar coding system which allows for the verification of the connection status as well as the nature of connectable elements. The system of the present invention provides bar code segments each of which includes machine-readable data and which may be used in cooperation to verify the appropriate connection status of the coupler pair as well as to identify the nature of the two members which are coupled. The present invention differs significantly from, and provides advantages over, prior art systems such as those of the '244 and '873 patents. These and other advantages will be apparent from the drawings, discussion, and description which follow.

BRIEF DESCRIPTION OF THE INVENTION

Disclosed herein is a system for verifying the connection status of a first and second couplable element. The system includes a code member having a pattern of indicia defining a machine-readable optical code displayed thereupon. This code member is physically divided into a first segment having a first portion of the pattern of indicia defined thereupon and a second segment having a second portion of the pattern defined thereupon. The first segment is positioned and disposed upon a first one of the couplable elements, and the second segment is positioned and disposed upon a second of the couplable elements so that when the couplable elements are appropriately connected together the first and second segments of the code members are in an aligned relationship so as to form a machine-readable pattern of optical data. The system may also include an optical reader which is operable to scan the first and second couplable elements and generate a signal indicating if the code segments are appropriately aligned so as to form the machine-readable code.

In some instances, one or both of the segments of the code body may be configured as a label which is affixable to a respective coupler element. In other instances, one or both of the segments may be painted onto, etched into, or otherwise marked upon a connector element. The data in the individual segments may also be chosen so as to encode particular information regarding the nature of that segment.

Also disclosed herein are methods which employ the verification system.

DETAILED DESCRIPTION OF THE INVENTION

As stated above, the present invention comprises a system and method for verifying the connection status of a set of couplable elements. This invention will be described primarily with reference to electrical connectors wherein a first terminal member is connectable to a second terminal member. However, it is to be understood that the invention may similarly be employed with regard to couplers which include three or more elements. The system may also be employed in connection with other types of couplable elements such as fluidic connectors, mechanical elements, insert members, and any other system in which the proper positioning of two or more elements with regard to one another or with regard to a third element is to be verified. As detailed generally above, the system and method of the present invention rely upon the use of an optically readable body of code, such as a bar code, which has been divided into two or more separate segments. Each segment comprises a portion of a pattern which encodes a body of data. The segments are affixed to the couplable elements so that when the elements are appropriately joined together, the code segments unite to form a code pattern which encodes a specific body of data which is indicative of proper coupling of the elements. It is a notable feature of the present invention that each of the segments of the body of data is optically readable, and as such may encode information separate from the body of data which indicates proper connection of the elements. In this manner, the code segments attached to the individual couplable elements can be used to identify and/or select those elements. The present invention may be implemented in a number of embodiments; and for purposes of illustration, a particular embodiment is described herein.

Figure 1:
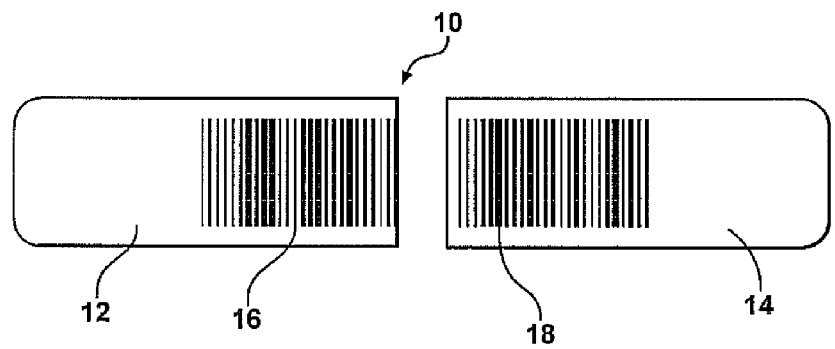
FIG. 1 shows a code member which has been physically divided into two separate segments in accord with the present invention.

Referring now to FIG. 1, there is shown a code member 10 which may be utilized in the practice of the present invention. As shown in FIG. 1, the code member 10 comprises two separate segments 12, 14. Each segment includes optically encoded data in the form of a bar code displayed thereupon. In this regard, segment 12 includes a code portion 16, and segment 14 includes a code portion 18. These code portions are shown as being one-dimensional bar codes, although it is to be understood that they may comprise two-dimensional, matrix, bar codes, or any other type of optically readable data encoding.

The segments 12 and 14 may be formed on label stock which may be subsequently applied to the couplable elements, or the segments may be formed directly on the couplable elements by etching, printing, scribing, molding, or other such processes. It will be seen from FIG. 1 that when the two segments 12 and 14 are disposed in an edge-to-edge alignment, the code segments 16 and 18 thereupon will form a continuous, optically readable code pattern. In the practice of the present invention, the segments are disposed upon the couplable elements such that when those elements are properly aligned, the code portions 16 and 18 will likewise align to form the data pattern.

The couplable elements are scanned by an optical data reader of the type known in the art; and if the reader detects the code pattern as formed by the properly aligned segments 12 and 14, the data reader will generate a corresponding signal indicating that the elements are properly aligned and connected. If the elements are misaligned, the segments will likewise be misaligned and the data reader will register an error with regard to the code pattern. As will be appreciated by those of skill in the art, the signals can be used to control an inspection and/or assembly process.

Figure 2:
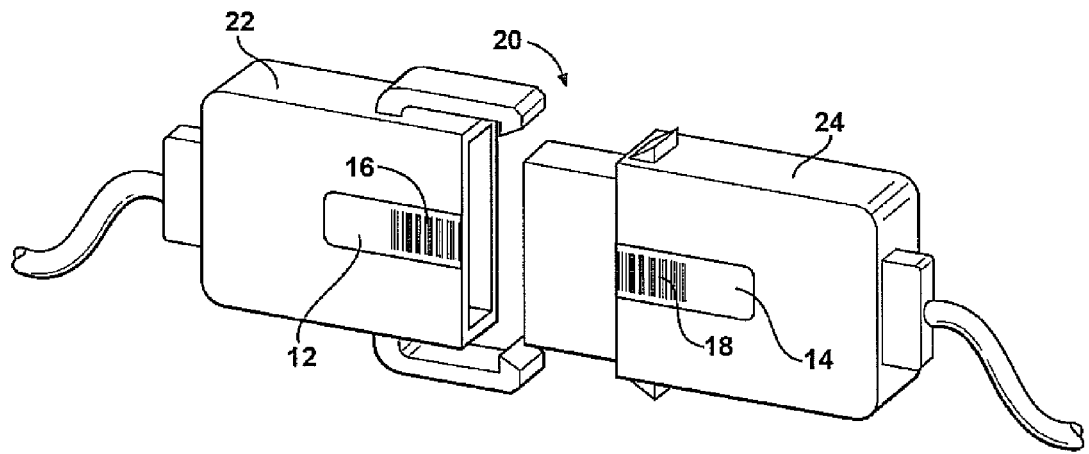
FIG. 2 shows an electrical connector comprised of a first and a second couplable element, each element including a segment of a code member disposed thereupon.

Referring now to FIG. 2, there is shown one typical implementation of the present invention. FIG. 2 shows an electrical connector pair 20 comprised of a female terminal member 22 and a male terminal member 24. Connectors of this type are typically used in a variety of electrical systems. In accord with the present invention, a first segment 12 of a code member having a first portion of a bar code 16 thereupon is affixed to the female member 22. A second code segment 14 having a second portion of a code 18 thereupon is disposed on the male connector 24. As noted above, these segments 12 and 14 may be comprised of separate members such as labels which are affixed to the terminal members 22 and 24, or they may comprise markings directly applied thereto.

Figure 3:
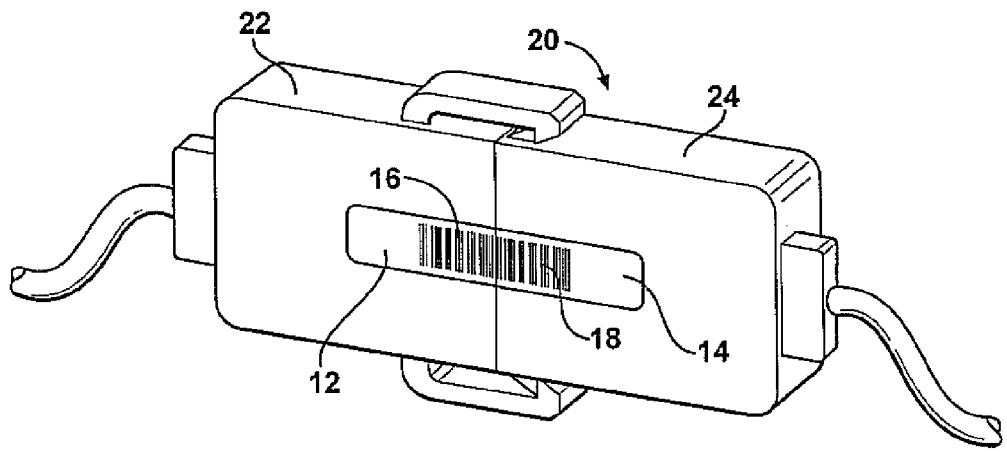
FIG. 3 depicts the coupler of FIG. 2 wherein the two couplable elements are joined together and the two segments form an optically readable code pattern.

As shown in FIG. 3, the two terminals 22 and 24 are coupled and locked together; and when such is done, the two code segments 12 and 14 are aligned in an edge-to-edge relationship so as to display a complete optical code comprised of the two portions 16 and 18. When the joined connector pair 20 is optically scanned, the body of optical code provides assurances that the terminals are correctly aligned and connected. In addition to being used for purposes of quality and process control, data of this type may be used to create a permanent record of the fact that a connector pair has been properly joined. This type of data can be very significant in those instances where the connector pair is a critical component of a safety system such as an airbag system. Such data can be cross referenced to data identifying a particular vehicle or installation. Such verifiable cross-reference data can be very valuable if future questions arise regarding performance of the safety system.

Figure 4:
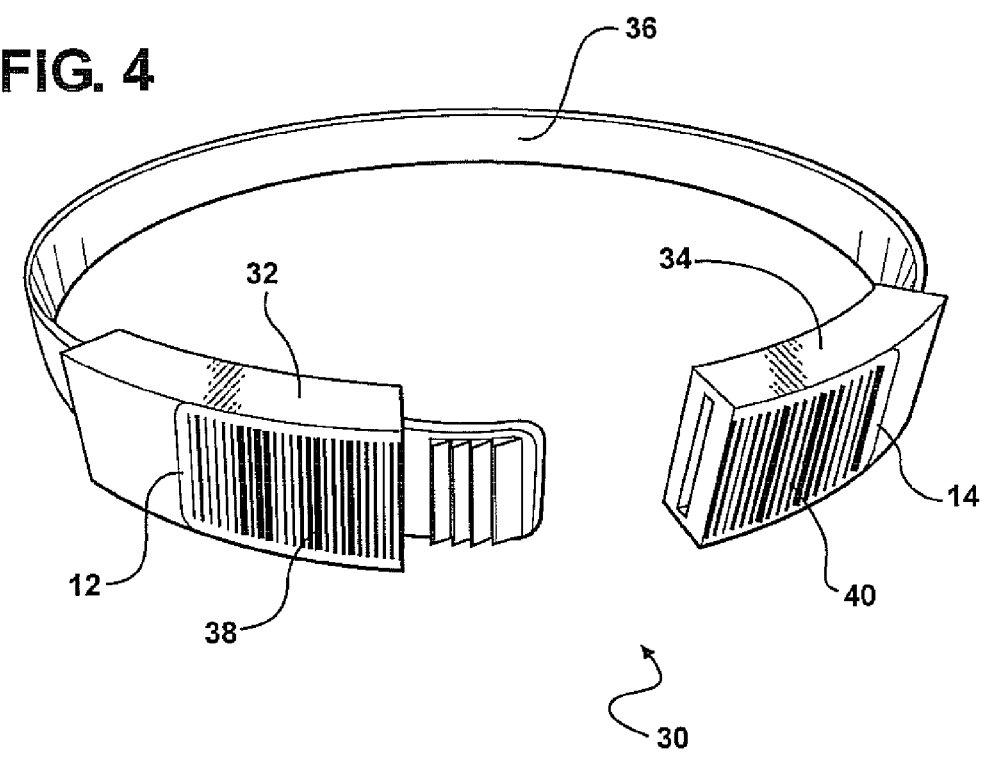
FIG. 4 depicts an embodiment of the present invention in which the couplable elements are part of a bracelet structure.

While the FIG. 2 and FIG. 3 embodiment shows two discrete, separated, couplable elements, in some instances, the couplable elements may be part of a unitary device. For, example, as is shown in FIG. 4, a "bracelet" type device 30, is comprised of a first connector element 32, and a second connector element 34, joined together by a band portion 36. As in the prior embodiment, each connector element 32, 34, includes a code segment 38, 40, disposed thereupon; and, when the connector elements 32,34 are properly joined, the segments align to constitute a bar code pattern indicative of proper coupling. Bracelet embodiments of this type may be constructed so that the connector elements are not releasable once joined, requiring that the bracelet must be cut to be removed. As will be appreciated, such embodiments may be used in various security applications. For example, the bracelet may be used as a verifiable source of identification of persons in health care, military and law enforcement applications. Likewise, the bracelet embodiments may be used a security seals for equipment, cargo and the like.

The fact that the system of the present invention utilizes a segmented, optically readable code in which each of the segments itself is also optically readable is a significant improvement over prior art systems. Since each segment of the code can be individually read, the encoded components may be tracked or otherwise monitored utilizing optical data prior to being coupled. Thus the system will not only operate to identify individual components, it will also verify if they are correctly joined. This can be critical in those instances where a number of like connectors are to be joined in a particular pattern. In such instance, connectors may be securely joined but still inappropriately connected, and a system of the present invention can verify if such is the fact.

As noted above, the system of the present invention can be implemented in a variety of embodiments, including embodiments in which three or more components are joined. In such instance, the code member will be divided into a corresponding number of segments. It should also be noted that while FIG. 1 depicts a body of optically readable one-dimensional bar codes being divided in a direction corresponding to the length of the individual bars, other embodiments of the present invention may be implemented utilizing coded bodies which are otherwise divided.

The foregoing is illustrative of particular embodiments of the present invention but is not meant to be a limitation upon the practice thereof. Other modifications, variations, and implementations of the invention will be apparent to those of skill in the art in view of the teaching presented herein. It is the following claims, including all equivalents, which define the scope of the invention.

The invention claimed is:

1. A system for verifying the connection status of a first and a second mechanically and reversibly engageable and disengageable couplable element, said system comprising:
   a first couplable element having a first portion of a machine-readable optical code defined thereupon; and
   a second couplable element, which is mechanically and reversibly engageable and disengageable with said first couplable element, said second couplable element having a second portion of a machine-readable optical code defined thereupon;
   wherein said first portion of said optical code is defined on said first couplable element, and said second portion of said optical code is defined on said second couplable element so that when said couplable elements are mechanically engaged, said first portion of said optical code and said second portion of said optical code are aligned so as to form a continuous, machine-readable optical code pattern, and so that when said couplable elements are mechanically disengaged said first portion of said optical code and said second portion of said optical code do not align to form said continuous, machine-readable optical code pattern.

2. The system of claim 1, wherein said pattern defining said machine-readable optical code is comprised of a plurality of light-absorbing indicia and a plurality of light-reflecting indicia.

3. The system of claim 1, wherein said machine-readable code is a bar code.

4. The system of claim 3, wherein said bar code is a one-dimensional bar code.

5. The system of claim 3, wherein said bar code is a two-dimensional bar code.

6. The system of claim 1, wherein at least one of said first and second segments of said code member comprises a label which is affixable to a respective couplable element.

7. The system of claim 1, wherein at least one of said first and second segments is integral with a respective couplable element.

8. The system of claim 1, wherein said machine-readable code encodes information corresponding to an attribute of at least one of said couplable elements.

9. The system of claim 1, wherein said first and second couplable elements are disposed on opposite ends of a band so as to be couplable to form a bracelet structure.

10. A method for verifying the connection status of a first and a second mechanically and reversibly engageable and disengageable couplable element, said method comprising the steps of:
    providing a first couplable element having a first portion of a machine-readable optical code defined thereupon;
    providing a second couplable element, which is mechanically and reversibly engageable and disengageable with said first couplable element, said second couplable element having a second portion of a machine-readable optical code defined thereupon;
    wherein said first portion of said optical code is defined on said first couplable element, and said second portion of said optical code is defined on said second couplable element so that when said couplable elements are mechanically engaged said first portion of said optical code and said second portion of said optical code are aligned so as to form a continuous, machine-readable optical code pattern, and so that when said couplable elements are mechanically disengaged said first portion of said optical code and said second portion of said optical code do not align to form said continuous, machine-readable optical code pattern;
    providing an optical scanner which is operable to scan said first and second reversibly engageable and disengageable elements and generate a signal indicating if said code segments are aligned so as to form said machine-readable code;
    scanning said first and second couplable elements with said scanner; and
    determining if said scanner has generated said signal indicating that said first and second code segments have been aligned, whereby said signal is indicative of said first and second couplable elements being mechanically engaged.

11. The method of claim 10, wherein said first and second couplable elements comprise an electrical connector.

12. The method of claim 10, wherein said code pattern is defined by a plurality of light-absorbing indicia and a plurality of light-reflecting indicia.

13. The method of claim 10, wherein said machine-readable optical code is a bar code.

14. The method of claim 13, wherein said bar code is a one-dimensional bar code.

15. The method of claim 13, wherein said bar code is a two-dimensional bar code.

16. The method of claim 10, wherein the step of affixing said first segment to said first couplable element, or the step of affixing said second segment to said second couplable element comprises affixing a label to said respective element.

17. The method of claim 10, wherein the step of affixing said first segment to said first couplable element, or the step of affixing said second segment to said second couplable element comprises integrally forming a portion of said pattern onto said respective elements.

* * * * *